(12) United States Patent
Wesby

(10) Patent No.: US 8,457,622 B2
(45) Date of Patent: *Jun. 4, 2013

(54) SYSTEM AND METHOD FOR REMOTE ASSET MANAGEMENT

(75) Inventor: Philip Bernard Wesby, Stratford-Upon-Avon (GB)

(73) Assignee: M2M Solutions LLC, Tiddington, Stratford-Upon-Avon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,756

(22) Filed: Apr. 19, 2012

(65) Prior Publication Data

US 2012/0243686 A1 Sep. 27, 2012

Related U.S. Application Data

(63) Continuation of application No. 12/479,295, filed on Jun. 5, 2009, now Pat. No. 8,180,336, which is a continuation of application No. 11/326,752, filed on Jan. 6, 2006, now Pat. No. 7,558,564, which is a continuation of application No. 10/515,094, filed as application No. PCT/GB03/02171 on May 21, 2003, now Pat. No. 7,027,808.

(30) Foreign Application Priority Data

May 21, 2002 (GB) .................................. 0211644.0

(51) Int. Cl.
*H04M 3/00* (2006.01)
(52) U.S. Cl.
USPC .......... 455/419; 455/423; 455/410; 455/406; 455/426.1; 455/9; 340/853.1; 340/514
(58) Field of Classification Search
USPC 455/419, 423, 410, 406, 426.1, 9; 340/853.1, 340/514
See application file for complete search history.

(56) References Cited

U.S. PATENT DOCUMENTS

| 4,465,904 A | 8/1984 | Gottsegen et al. ............ 179/5 R |
| 4,855,713 A | 8/1989 | Brunius ........................ 340/506 |

(Continued)

FOREIGN PATENT DOCUMENTS

| DE | 196 25 581 | 12/1997 |
| DE | 197 07 681 | 5/1998 |

(Continued)

OTHER PUBLICATIONS

Azzaro et al., U.S. Appl. No. 60/162,249, filed Oct. 28, 1999, 21 pages.

(Continued)

*Primary Examiner* — Nghi H Ly
(74) *Attorney, Agent, or Firm* — Sunstein Kann Murphy & Timbers LLP

(57) ABSTRACT

A remote asset management system comprising a network of programmable wireless modules, each having an antenna and an identification module and configured to communicate via a radio communication protocol. The system further includes a plurality of assets each linked to one of the wireless modules and configured to be managed by the linked wireless module. A remote system server service platform is configured to receive remote asset data from the wireless modules, pass the remote asset data to and from the wireless modules, send messages to at least one of the wireless modules, monitor the wireless modules by requesting and receiving current mode information, and remotely program the wireless modules. A data processing module located within the wireless module(s) and configured to process messages received by the wireless module, authenticate said message, analyze authenticated messages, and carry out asset management instructions included in the message.

47 Claims, 4 Drawing Sheets

U.S. PATENT DOCUMENTS

| | | | |
|---|---|---|---|
| 4,908,853 A | 3/1990 | Matsumoto | 379/355 |
| 4,951,029 A | 8/1990 | Severson | 340/506 |
| 5,276,729 A | 1/1994 | Higuchi et al. | 379/58 |
| 5,293,418 A | 3/1994 | Fukawa | 379/58 |
| 5,381,138 A | 1/1995 | Stair et al. | 340/825.44 |
| 5,396,264 A | 3/1995 | Falcone et al. | 345/146 |
| 5,548,271 A | 8/1996 | Tsuchiyama et al. | 340/311.1 |
| 5,581,599 A | 12/1996 | Tsuji et al. | 379/63 |
| 5,581,803 A | 12/1996 | Grube et al. | 455/54.1 |
| 5,623,533 A | 4/1997 | Kikuchi et al. | 379/58 |
| 5,689,442 A | 11/1997 | Swanson et al. | 364/550 |
| 5,689,563 A | 11/1997 | Brown et al. | 380/23 |
| 5,742,666 A | 4/1998 | Alpert | 379/58 |
| 5,745,049 A | 4/1998 | Akiyama et al. | 340/870.17 |
| 5,752,976 A | 5/1998 | Duffin et al. | 607/32 |
| 5,771,455 A | 6/1998 | Kennedy, III et al. | 455/456 |
| 5,774,804 A | 6/1998 | Williams | 455/419 |
| 5,802,460 A | 9/1998 | Parvulescu et al. | 455/92 |
| 5,831,545 A | 11/1998 | Murray et al. | 340/825.49 |
| 5,878,339 A | 3/1999 | Zicker et al. | 455/419 |
| 5,884,161 A | 3/1999 | Hegeman | 455/414 |
| 5,903,634 A | 5/1999 | Wakabayashi et al. | 379/127 |
| 5,940,752 A | 8/1999 | Henrick | 455/419 |
| 5,946,636 A | 8/1999 | Uyeno et al. | 455/566 |
| 5,948,064 A | 9/1999 | Bertram et al. | 709/225 |
| 5,960,366 A | 9/1999 | Duwaer | 455/556 |
| 5,974,312 A | 10/1999 | Hayes, Jr. et al. | 455/419 |
| 5,995,603 A | 11/1999 | Anderson | 379/142 |
| 5,999,990 A | 12/1999 | Sharrit et al. | 710/8 |
| 6,026,293 A | 2/2000 | Osborn | 455/411 |
| 6,031,828 A | 2/2000 | Koro et al. | 370/336 |
| 6,041,229 A | 3/2000 | Turner | 455/420 |
| 6,072,396 A | 6/2000 | Gaukel | 340/573.4 |
| 6,075,451 A | 6/2000 | Lebowitz et al. | 340/825.06 |
| 6,078,948 A | 6/2000 | Podgorny et al. | 709/204 |
| 6,108,521 A | 8/2000 | Foladare et al. | 455/31.3 |
| 6,125,273 A | 9/2000 | Yamagishi | 455/411 |
| 6,144,859 A | 11/2000 | LaDue | 455/511 |
| 6,148,197 A | 11/2000 | Bridges et al. | 455/432.3 |
| 6,157,318 A | 12/2000 | Minata | 340/825.18 |
| 6,172,616 B1 | 1/2001 | Johnson et al. | 340/870.12 |
| 6,198,390 B1 | 3/2001 | Schlager et al. | 340/540 |
| 6,208,839 B1 | 3/2001 | Davani | 455/31.3 |
| 6,208,854 B1 | 3/2001 | Roberts et al. | 455/417 |
| 6,215,994 B1 | 4/2001 | Schmidt et al. | 455/419 |
| 6,230,002 B1 | 5/2001 | Flodén et al. | 455/411 |
| 6,275,143 B1 | 8/2001 | Stobbe | 340/10.34 |
| 6,288,641 B1 | 9/2001 | Casais | 340/539 |
| 6,289,084 B1 | 9/2001 | Bushnell | 379/67.1 |
| 6,295,449 B1 | 9/2001 | Westerlage et al. | 455/422 |
| 6,308,083 B2 | 10/2001 | King | 455/556 |
| 6,314,270 B1 | 11/2001 | Uchida | 455/67.1 |
| 6,377,161 B1 | 4/2002 | Gromelski et al. | 340/7.45 |
| 6,411,198 B1 | 6/2002 | Hirai et al. | 340/7.6 |
| 6,424,623 B1 | 7/2002 | Borgstahl et al. | 370/230 |
| 6,442,432 B2 | 8/2002 | Lee | 607/59 |
| 6,487,478 B1 | 11/2002 | Azzaro et al. | 701/24 |
| 6,496,777 B2 | 12/2002 | Tennison et al. | 701/213 |
| 6,553,418 B1 | 4/2003 | Collins et al. | 709/224 |
| 6,573,825 B1 | 6/2003 | Okano | 340/7.51 |
| 6,577,881 B1 | 6/2003 | Ehara | 455/563 |
| 6,606,508 B2 | 8/2003 | Becker et al. | 455/567 |
| 6,611,755 B1 | 8/2003 | Coffee et al. | 701/213 |
| 6,633,784 B1 | 10/2003 | Lovelace, II et al. | 700/65 |
| 6,658,586 B1 | 12/2003 | Levi | 714/4 |
| 6,759,956 B2 | 7/2004 | Menard et al. | 340/539.19 |
| 6,832,102 B2 | 12/2004 | I'Anson | 455/556.1 |
| 6,833,787 B1 | 12/2004 | Levi | 340/539.13 |
| 6,873,842 B2 | 3/2005 | Elayda et al. | 455/418 |
| 6,922,547 B2 | 7/2005 | O'Neill et al. | 455/17 |
| 6,970,917 B1 | 11/2005 | Kushwaha et al. | 709/217 |
| 6,985,742 B1 | 1/2006 | Giniger et al. | 455/456.1 |
| 6,988,989 B2 | 1/2006 | Weiner et al. | 600/300 |
| 7,027,808 B2 | 4/2006 | Wesby | 455/419 |
| 7,084,771 B2 | 8/2006 | Gonzalez | 340/573.1 |
| 7,254,601 B2 | 8/2007 | Baller et al. | 709/200 |
| 7,558,564 B2 * | 7/2009 | Wesby | 455/419 |
| 7,583,197 B2 | 9/2009 | Wesby Van Swaay | 340/573.4 |
| 7,599,681 B2 | 10/2009 | Link, II et al. | 455/411 |
| 8,180,336 B2 | 5/2012 | Wesby | 455/419 |
| 2001/0001234 A1 | 5/2001 | Addy et al. | 340/531 |
| 2002/0046353 A1 | 4/2002 | Kishimoto | 713/202 |
| 2002/0080938 A1 | 6/2002 | Alexander, III et al. | 379/106.01 |
| 2002/0198997 A1 | 12/2002 | Linthicum et al. | 709/227 |
| 2003/0176952 A1 | 9/2003 | Collins et al. | 700/286 |
| 2010/0035580 A1 | 2/2010 | Wesby-Van Swaay | 455/411 |

FOREIGN PATENT DOCUMENTS

| | | |
|---|---|---|
| DE | 19707681 | 5/1998 |
| EP | 0 432 746 | 6/1991 |
| EP | 0 524 652 | 1/1993 |
| EP | 0 772 336 | 5/1997 |
| EP | 0996302 | 4/2000 |
| EP | 1 013 055 | 6/2000 |
| JP | 07087211 | 3/1995 |
| JP | 9-64950 | 3/1997 |
| JP | 2000-115859 | 4/2000 |
| JP | 2000 115859 | 4/2000 |
| JP | 2000-135384 | 5/2000 |
| JP | 2001-177668 | 6/2001 |
| JP | 2001-249860 | 9/2001 |
| JP | 2002-077438 | 3/2002 |
| WO | WO 97/23104 | 6/1997 |
| WO | WO 98/51059 | 11/1998 |
| WO | WO 99/13629 | 3/1999 |
| WO | WO 99/34339 | 7/1999 |
| WO | WO 00/56016 | 9/2000 |
| WO | WO 00/70889 | 11/2000 |
| WO | WO 01/03414 | 1/2001 |
| WO | WO 01/03414 | 8/2001 |

OTHER PUBLICATIONS

International Searching Authority, International Search Report—International Application No. PCT/GB 03/02171, dated Oct. 28, 2003, 3 pages.

\* cited by examiner

SYSTEM AND METHOD FOR REMOTE ASSET MANAGEMENT

CROSS REFERENCE TO RELATED APPLICATIONS

This patent application is a continuation of and claims priority from all priority dates of U.S. patent application Ser. No. 12/479,295, filed Jun. 5, 2009, and entitled "System and Method for Remote Asset Management". As a consequence of this priority claim, this patent application also claims priority to U.S. patent application Ser. No. 11/326,752, filed Jan. 6, 2006, and entitled "System and Method for Remote Asset Management" which is a continuation of and claims priority to U.S. patent application Ser. No. 10/515,094, filed Nov. 19, 2004, and entitled "System and Method for Remote Asset Management", which is a National Phase filing of and claims priority to PCT/GB03/02171 filed on May 21, 2003, which further claims priority from U.K. Application GB0211644.0, filed May 21, 2002. The disclosures of each of these applications are incorporated herein by reference in their entirety.

BACKGROUND OF THE INVENTION

The invention relates to a system and method for remote asset management. More particularly, it relates to a system and method for remotely managing a plurality of assets, which may be fixed or movable, wherein each comprises a wireless module interfaced with the operating system or control means of said asset and is capable of exchanging asset control data with operational data stored remotely on a dedicated server platform. The said system and method for remote asset management can provide an improved means for locating, monitoring, and controlling remotely the use of fixed and or movable assets as well as providing the basis for a network-based service platform for providing a range of diverse corporate and consumer services.

The invention relates to and significantly improves upon a previously filed patent application claiming Finnish priority of 23 May 2000 entitled Programmable Communicator published as international patent application WO01/91428 A2.

In this previously filed application, is taught the invention of an improved wireless telecommunications platform for remote monitoring purposes which can be programmed remotely by a mobile phone or any type of Personal Data Assistant, either at close range using Blue Tooth, or infra red light, or via a mobile telecommunications network connection.

The current invention builds upon the teaching of this earlier application and extends the concept significantly such that it has more general and suitable application for remote asset management and control of the asset by making use of a programmable wireless module, which is linked to an asset interface module associated with the asset via a programmable port module.

Today, the mobile telecommunications industry is making a transition towards high bandwidth high capacity 3rd Generation wireless networks.

The associated costs of the 3rd Generation wireless network infrastructure and the lack of market drivers are challenging the growth of the mobile industry. Clearly, a diverse range of mobile services is required which can offer a high growth of subscription contracts and which can also run efficiently and effectively on today's 2nd Generation telecommunications infrastructure. The system and method according to the present invention is directed towards this requirement area.

Generally, few interactive systems are available which make the most efficient use of the limited bandwidth of the $2^{nd}$ Generation telecommunications infrastructure. In particular, the remote monitoring of assets and facilities is not optimised to make use of the mobile telecommunications network infrastructure in the most efficient and cost-effective way. Today, a diverse range of electronic tags is available for determining the location of vehicles and such like, while other systems are available for providing operational status data of remote devices. In the case of facilities security, private individuals either choose to invest in improved door and window locks or pay high subscription rates for outsourced security.

In the context of mobile telecommunications there exists a need for a more efficient solution in the area of remote asset management. To improve upon prior art systems it would be beneficial if each asset would comprise the capability to enable a remote server to determine the operational status of the said asset and change its operational status according to preset conditions, thereby affording the provision of a range of diverse services for a wide range of asset management applications.

In the area of remote facilities management, it would be beneficial if fire and intruder alarm systems were fully integrated and could communicate automatically via a remote system server to alert the appropriate emergency services. Moreover, in places where there is limited fixed telecommunications infrastructure, such a system would benefit from a wireless capability.

In the area of laptop computers, which contain valuable or strategic data, it would be beneficial if a remote asset management solution existed which could determine the location of the computer, and or change the operational condition of the computer and its related power supply and or render the computer unusable from a remote location by making use of data messages transmitted to the computer from a remote server. Such a solution would both help to locate the computer remotely and prevent unauthorised access of stored data. Also, and in general, such a solution would enable a company to trace the whereabouts of its computer workstation inventory automatically by sending requests for each to return its current GPS coordinate.

In the same area of application, laptop users sometimes experience difficulty in accessing their computer when it is locked down due to an access password being forgotten, or when the process of changing the password is interrupted after the old password expires. Such a situation can be quite stressful if a professional user is travelling on behalf of her employer and must make a laptop presentation to a client. Today, this access denial situation is usually remedied by contacting the company help desk, authenticating oneself, and requesting the default hard drive password.

Often, help desk staff are unavailable or they require details to be E-mailed, which is impossible when access is denied. Furthermore, remote authentication and transfer of complicated default drive passwords is very challenging. A system and method, which makes possible the remote authentication of the laptop user and subsequent transfer of the default password to the laptop by sending data messages via a remote server, would be very beneficial.

In the area of consumer devices such as video recorders and other household equipment including heating systems and the like, it would be beneficial if equipment could be programmed remotely. Such a system would enable a consumer to send simple commands via a remote server to a solid-state video recorder to record a favourite program or to switch on a sauna heater or central heating system remotely.

In an additional application area there exists the need for a system and method to enable authorised personnel to interact with systems and change their operational status by use of, for example, a mobile phone or similar PDA device. Road safety, for example, would be improved if it were possible for a highway patrol officer to activate and or change highway traffic speed indicators from his vehicle or from his handheld wireless communicator in the case of a change in driving conditions such as due to an accident or change in weather.

In an additional application area, there exists the need to monitor the operational status of an asset for servicing purposes. A vehicle, for example, would benefit from a system, which could link the vehicle to a vehicle-servicing centre to enable remote analysis of the engine performance and thereby assist vehicle service scheduling. Furthermore, the same system would enable remote management of the engine such that changes to the engine operation parameters could be uploaded as well as providing the means to disable some features of the vehicle to help prevent theft. Clearly, a remote lock-down feature combined with a position determination capability would greatly reduce vehicle theft and improve recovery of a stolen vehicle.

In an associated vehicle application area there exists the need for a system and method to update the stored data on satellite navigation vehicle guidance systems. Such systems when deployed do not have the facility for the road data to be updated as road systems change. A system and method, which would make possible the updating of the data in an efficient way, would greatly improve the usability of such systems.

In the area of mobile phones and other battery operated equipment, such as laptops or radio transponder identification tags, it would be beneficial if the devices could be programmed remotely to power down for certain periods of time and to power up for certain pre-programmed intervals. Such a programmable power duty cycle would greatly extend the time between charges of the associated battery supply and when combined with an integrated self-positioning Satellite Navigation Global Positioning System capability, would enable transponder tracking on a need-to-know basis. When tagged inventory is in warehouse facilities there is no need to monitor regularly the location of the assets. Should the inventory be mislaid, such a capability would greatly assist in locating the asset in a way, which makes the most efficient use of the associated battery supply.

It would be further beneficial if the device had the additional capability to report back the battery charge level of the battery supply to a remote server to indicate when the device would need recharging. The same system would also afford the capability to auto-power up and transmit other data according to a range of preset alarm conditions.

In a further area of application, consumers would benefit from a system, which gathered data according to the use of a particular asset and forwarded this data to a remote server for the purpose of optimising the asset and for designing an appropriate range of services to support the said use of the asset. For example, any communication device which comprised a range of options such as pull down menus for internet or dedicated service access might be improved if the range of options were prioritised automatically according to the way the user preferred to use the device or in the order of access of mostly used features.

In a further area of application, consumers would benefit from an automatic parking meter having a designated identification, which could receive messages via a remote server from a vehicle owner's mobile phone and program the parking meter for a period of time. In such a way parking meters could be charged against the mobile phone owner's subscription and the vehicle owner would not need to leave the vehicle and put money into the meter.

In a further area of application, consumers would benefit from a system, which would enable utility meters such as gas, water and electricity meters to be read remotely. If a device were integrated with the readout of the meter such that usage data could be communicated wirelessly, such a system would save the time and effort involved in reading the meter manually.

In an additional application area, in an instance where a security guard is alerted and wishes to secure a monitored area, it would be beneficial if a mobile phone message could be received by a remote server and cause data instructions to be communicated to one or more wireless control modules which might lock doors remotely or disable the functionality of certain devices.

In an additional application area, hikers and mountaineers or skiers in difficulty would benefit from a smart clothes user-programmable communications tag which comprised the means to attach itself to their clothing, which is pre-programmed to be linked with a fixed or mobile telephone and need only have its protruding button pressed to make communication with a central alarm point. Moreover, in an instance where an individual is lost or injured and less able to communicate effectively, a system solution is needed which automatically translates a GPS positional coordinate into a meaningful text message or voice message giving clear details of who the person is and where the person is calling from.

In the application areas outlined above, such as for attaching a wireless communications module to an article of clothing, or to a device to be monitored, an improved rugged design is required which both protects the cell phone engine and battery and which looks stylish. For example, in the application area of youth security, children are often reluctant to wear the device unless its shape and form has a positive association with an icon of fashion or an extreme sport such as mountaineering. The shape and form of the wireless module is designed to address this image aspect directly.

In an additional application area such as for freight tracking and asset location, an improved design for an electronic tag is required which is fully integrated with the packaging material surrounding the asset. In the particular application of passenger luggage, suitcases and briefcases should comprise the means to enable remote asset tracking and location determination as well as remote control of access to the luggage wherein the means is fully integrated with the structure and locking means of the luggage.

In a further area of application, consumers would benefit from a system, which would improve the security involved with cash withdrawal from a bank Automatic Teller Machine using a bankcard. An auxiliary system and method, which enabled a specific ATM to permit a bank customer to use their bankcard to access and withdraw funds for a predetermined time interval, would reduce crime. If the system required such a message before cash could be withdrawn, stealing ATM bank cards would be less attractive.

Today, the mobile telecommunications infrastructure is designed and utilised almost entirely as a wireless communications channel for voice communication and for sending data messages wherein the mobile phone is considered as an end point of the communication. The system and method for remote asset management of the current invention significantly extends the capability of the wireless infrastructure through the management of wireless modules associated with remotely located assets such that the said wireless modules are no longer communication end points within themselves but serve as functional gateways for controlling associated assets. Correspondingly, the system and method according to the current invention provides a versatile means for building and operating a diverse and comprehensive set of consumer and business services.

Further to these limitations of existing technologies, and so far as is known, no wireless asset management system and method is presently available which is directed towards the specific needs of this problem area as outlined.

SUMMARY OF THE INVENTION

Accordingly, it is an object of the present invention to provide an improved remote asset management system, which comprises the means to communicate data from a fixed or mobile communications device either directly or via a remote server to one of a plurality of wireless modules, each associated with at least one remotely located asset to be managed, such that the communicated data enables the operational characteristics of the said asset to be monitored and or modified according to pre-programmed conditions.

It is a further object of the present invention to provide an improved remote asset management system, which comprises a dedicated network server or Internet-based server, which is programmed with the operational details of a plurality of assets to be managed remotely and which manages the communication messages sent to and received from the wireless modules each associated with at least one of said assets.

It is a further object of the present invention to provide an improved remote asset management system, which comprises a plurality of wireless modules such that each wireless module is interfaced with an operational feature of an asset to be monitored such as the software operating system of the said asset such that data messages sent to the wireless module may thereby effect some change in the use or performance of said asset.

It is a further object of the present invention to provide an improved remote asset management system, which comprises a plurality of wireless modules such that each wireless module is interfaced with an operational feature of an asset to be monitored such as the electronic control means of the said asset such that data messages sent to the wireless module may thereby effect some mechanical change in the use or performance of said asset.

It is a further object of the present invention to provide an improved remote asset management system, which comprises a plurality of wireless modules such that each wireless module is interfaced with an operational feature of an asset to be monitored such that the said module may comprise or be interfaced with an electromechanical servo means which may be controlled directly through data messages sent to the wireless module and thereby effect some mechanical change in the use or performance of said asset.

It is a further object of the present invention to provide an improved remote asset management system, which comprises a plurality of wireless modules such that each wireless module is interfaced with an operational feature of an asset to be monitored such that the said module may comprise or be interfaced with a stepper motor means which may be controlled directly through data messages sent to the wireless module and thereby effect some mechanical change in the use or performance of said asset.

It is a further object of the present invention to provide an improved remote asset management system, which comprises a plurality of wireless modules such that each wireless module is interfaced with an operational feature of an asset to be monitored such that the said module may comprise, or may be interfaced with a thermocouple means which may pass voltage values to the wireless module corresponding to temperatures measured by said thermocouple.

It is a further object of the present invention to provide an improved remote asset management system having direct application to the remote reading of gas, water and electricity utility meters, which comprises a plurality of wireless modules wherein each module is associated with at least one utility meter such that each wireless module may comprise, or may be interfaced with an inductive coil reading system to enable encoded output utility meters and pulse output utility meters to be read remotely by the utility service company.

Alternatively the module may be directly interfaced with the flow meter itself such that where a changing jet of water flow causes an electromotive force to be generated in a flow device such that this force disrupts a powerful magnetic field which is passively monitored by a number of electrodes which send a signal to a processing circuit, the rate of flow generated by the frequency of oscillation is totalised and sent directly to the wireless module as a totalised flow measurement either periodically or in response to receiving a request from the wireless module.

It is a further object of the present invention to provide an improved remote asset management system having direct application to remote environmental sensing systems, which comprises a plurality of wireless modules wherein each module comprises or is associated with the means to sense one or more of the following environmental data types such as acidity level, alkalinity level, concentration of dissolved oxygen, carbon monoxide level, contaminant concentration, level of radioactivity, ultrasound level, humidity level, air pressure level, levels of rivers, and wind speed, and wherein each module may further comprise a solar cell to recharge its own power supply.

It is a further object of the present invention to provide an improved remote asset management system, which comprises a remote server which is designed to receive and process incoming data messages from one or more fixed or mobile communications devices wherein said messages relate to specific remote asset management applications or personal security applications such that the said server is programmed to communicate specific application data and or voicemail messages to one or more wireless modules and or fixed or mobile subscriber numbers and or IP addresses or Email addresses in response to receiving each of said data messages.

It is a further object of the present invention to provide an improved remote asset management system, which comprises a remote server that is pre-programmed to receive and process subscriber number information and GPS coordinate information such that it may cause a data message and or a voicemail message to be sent to a specific fixed or mobile subscriber number and or IP address or Email address in response to the receipt of said GPS coordinate information.

It is a further object of the present invention to provide an improved remote asset management system, which comprises a remote server that is pre-programmed to receive and process subscriber number information and or IP address identification and GPS coordinate information from each of a plurality of wireless modules wherein following processing of the received data from a specific wireless module, the server may determine that a data message is to be sent to the specific module which causes a change in the operational status of the wireless module and or associated asset.

It is a further object of the present invention to provide an improved remote asset management system, which comprises a remote server that is pre-programmed to store operational data for one or more types of asset including one or more data types such as asset type, asset model number, asset operating system type, asset power supply type, back-up battery supply, power supply duty cycle parameters, critical parameters for disabling specific functionality of the asset, location data of the asset as a function of time and stored at specified intervals for a specified duration, asset performance monitoring parameters, service history of the asset, location history of the asset, performance optimisation parameters, and security lock-down features. The said server may also receive data periodically, and or it may request data according to predetermined conditions, and or it may be sent data by the wireless module in response to a change in status of the associated asset such as an alarm condition or in response to a status interrogation request sent to the wireless module from any fixed or mobile device.

It is a further object of the present invention to provide an improved remote asset management system, which makes possible the creation of a diverse range of new mobile services which can offer a high growth of subscription contracts and which can run efficiently and effectively on existing telecommunications infrastructure without requiring any changes to the said infrastructure.

It is a further object of the present invention to provide an improved remote asset management system, which is capable of determining the location of vehicles as well as offering the means to monitor and or change the operational status of one or more systems operating on the vehicle.

It is a further object of the present invention to provide an improved remote asset management system, which comprises a plurality of wireless modules wherein each may comprise a GPS module and wherein each is capable of periodically determining a GPS position fix and storing this data according to a programmable period such that a remote server can request one or more of the stored data and the times when the data were stored.

It is a further object of the present invention to provide an improved remote asset management system for vehicle service applications, which is capable of remotely monitoring the performance of the vehicle engine and transmitting performance enhancement data to the vehicle to modify the performance of the engine.

It is a further object of the present invention to provide an improved remote asset management system for vehicle service applications, which comprises the capability for remote fault diagnosis and vehicle service scheduling such that in response to remote analysis of engine performance data, the vehicle service centre may communicate directly with the vehicle display panel and communicate when the vehicle should next come for servicing.

It is a further object of the present invention to provide an improved remote asset management system for the application of satellite navigation vehicle guidance systems, wherein the system and method provides the means to complement vehicle GPS systems by making possible the receipt and storage of up-to-date route data by the said vehicle system. Over time, the stored GPS data becomes outdated as changes are made to the road network. The remote asset management system according to the invention can organise and transmit navigational map data to complement and or modify the GPS data stored in the vehicle system. Such updates may be made using encoded messages, such as SMS, and transmitted over the mobile phone infrastructure to the wireless module associated with the in-vehicle navigation system when the network is least congested such as during the night.

It is a further object of the present invention to provide an improved remote asset management system for facilities management, which comprises the means to communicate data to a remotely located server automatically, and or periodically, and or in response to a change in environmental conditions monitored by a dedicated sensor means associated with the asset such as change in temperature and or the movement of air and or a change in sound level and or a change in the monitored chemical composition of the environment and or change in light intensity and or change in humidity.

It is a further object of the present invention to provide an improved remote asset management system for facilities management, which affords the capability for a new and improved wireless fire alarm.

It is a further object of the present invention to provide an improved remote asset management system for facilities management, which comprises the means for remotely monitoring and controlling the functionality of an air conditioning system.

It is a further object of the present invention to provide an improved remote asset management system for facilities management, which comprises the means for remotely controlling the power to a mains powered device such that data messages received by the wireless module may cause the mains power to the said device be switched on or off.

It is a further object of the present invention to provide an improved remote asset management system for facilities management, which comprises the means for remotely monitoring access to a building or enclosed area and communicating the presence and or movement of any persons within the monitored facilities to a remotely located server either independently or in response to status monitoring requests. Furthermore, according to changes in the data values generated by the said facilities management system, the server may consequently generate one or more alarm conditions and communicate data messages to security personnel and or security control centres and or systems controlling doors and barriers which allow access to the said facilities.

It is a further object of the present invention to provide an improved remote asset management system for facilities management, which comprises the means for remotely monitoring the status and or changes in the positions of doors and windows and communicating said changes to a remotely located server either independently or in response to status monitoring requests.

It is a further object of the present invention to provide an improved remote asset management system, which comprises the means to communicate with a wireless module associated with a computer for the purpose of remotely monitoring the use of the computer and or for sending data to the computer for the purpose of changing the performance of the computer.

It is a further object of the present invention to provide an improved remote asset management system, which comprises the means to communicate remotely with a laptop computer wherein said computer comprises a wireless module comprising a GPS chipset such that the said module may be remotely interrogated to determine its current geographical location and or one or more previously stored geographical coordinates.

It is a further object of the present invention to provide an improved remote asset management system, which comprises the means to communicate remotely with a wireless module associated with a computer, either independently and or periodically, or in direct response to a change in status of one or more operational parameters of the said computer such that the wireless module further comprises the means to render inoperable certain or all functionality of the said computer thereby preventing access to any stored data.

It is a further object of the present invention to provide an improved remote asset management system, which comprises the means to communicate remotely with a wireless module associated with a fixed or portable computer such that a default access password can be transferred to the said computer, either directly or via a remote server, to enable an authorised and authenticated user to gain access to the data on the computer when the user has forgotten the access password or when the password does not work.

Furthermore, the transfer of a first access password to the said wireless module may activate a software module which both establishes a secure communication channel between the laptop and the company helpdesk server and provides sufficient access to the computer to enable the user to authenticate herself by returning confidential identification data to the authentication server at the company premises such that the server may authenticate the user and authorise complete access to the computer by sending a second access password to the wireless module.

It is a further object of the present invention to provide an improved remote asset management system, which comprises the means to communicate remotely with a wireless module associated with a computer, either independently and or periodically, or in direct response to a change in status of one or more operational parameters of the said computer such that the wireless module further comprises the means integrated with the motherboard of the computer to enable remote access to the critical control parameters of the computer's operating system such as for example to enable the BIOS parameters to be changed remotely.

It is a further object of the present invention to provide an improved remote asset management system, which comprises the means to communicate remotely with a wireless module associated with a computer, such that the communication channel between a remote server and the said wireless module is encoded using a pair of keys wherein each is generated from data stored at either end of the communication link.

It is a further object of the present invention to provide an improved remote asset management system, which comprises the means to communicate remotely with a wireless module wherein said module comprises a rechargeable power supply and or an associated solar cell for recharging the power and or it may comprise an additional NICAD cell or equivalent battery of limited power, such that the rechargeable power supply comprises a timing means and a control means to enable remote management of the power duty cycle of the said module. In particular, the wireless module may receive data messages, which instruct the module to power down to a very low level, thereby conserving power, such that the power level is sufficient to maintain timing and control functionality which enable the module to power up at predetermined intervals to enable exchange of data with the remote server.

In this way the interval between recharging is greatly extended and the wireless modules only power up according to a predetermined duty cycle.

It is a further object of the present invention to provide an improved system and method for remote asset management, which is suitable for any type of wireless device in general, such as a mobile phone, wherein each said device comprises a rechargeable battery and a duty cycle power management capability such that the wireless device can be remotely programmed via a server or via a computer connected to the Internet or directly from another wireless terminal or directly programmed manually to cause the said device to power down for predetermined intervals and thereby extend the interval between battery recharging. All manner of remote programming methods may be employed such as SMS, GPRS, data call and GSM EDGE as well as WLAN, TCP IP, Infra Red light and Blue Tooth radio communication. In particular, each wireless device may be programmed to power down automatically when communication is not suitable such as during regular sleeping hours and to power up when persons are available for communication such as during working hours, in between lectures and or during lunch intervals.

It is a further object of the present invention to provide an improved remote asset management system, which is suitable for the remote programming of consumer devices such as solid state video recorders and other household equipment including heating systems and the like wherein the remote server may monitor the scheduling of preferred television broadcasts according to stored user preferences and forward messages of upcoming programmes to the user and organise the programming of a home video recorder in response to receiving messages back from the user.

Similarly other household equipment such as a sauna heater or heating system may be controlled remotely.

It is a further object of the present invention to provide an improved remote asset management system, which is suitable to enable authorised personnel to interact with systems and change their operational status by use of, for example, a mobile phone or similar PDA device such as for the activation or change of highway traffic speed indicators, wherein the wireless module receives data from authorised personnel or systems to change the display of the speed indicator to suit changing driving conditions due to an accident or change in weather.

It is a further object of the present invention to provide an improved remote asset management system, which is suitable for radio transponder identification tags wherein the tags are programmed remotely to power down for certain periods of time and to power up for certain pre-programmed intervals. The programmable power duty cycle extends the time between charges of the associated battery supply and when combined with an integrated self-positioning Satellite Navigation Global Positioning System capability, makes possible transponder tracking on a need-to-know basis. The transponder tag also has the capability to report back the battery charge level of the battery supply to a remote server to indicate when the device would need recharging. The same system also affords the capability to auto-power up and transmit other data according to a range of preset alarm conditions as determined by sensors associated with the wireless module.

It is a further object of the present invention to provide an improved remote asset management system, which has application to freight tracking and asset location and personal luggage security wherein the wireless module is fully integrated with the packaging material surrounding the asset and or the structure of the said luggage and or the associated locking means of a suitcase or briefcase or the like.

It is a further object of the present invention to provide an improved remote asset management system, which gathers data according to the use of a particular asset and forwards this data to a remote server for the purpose of optimising the asset and for designing an appropriate range of services to support the said use of the asset wherein the wireless module may comprise a display having a range of options such as pull down menus for internet or dedicated service access and wherein these might be improved if the range of options were prioritised automatically according to the way the user preferred to use the device or in the order of access of mostly used features.

It is a further object of the present invention to provide an improved remote asset management system having direct application to automatic parking meters having a designated identification, wherein each parking meter comprises a wireless module according to the present invention such that it is able to receive messages via a remote server from a vehicle owner's mobile phone and program the parking meter to indicate paid parking for a specified period of time.

It is a further object of the present invention to provide an improved remote asset management system having direct application to hikers and mountaineers or skiers in difficulty wherein each such person has a smart clothes user-programmable communications tag which comprises the means to attach itself to their clothing, which is pre-programmed to be linked with a fixed or mobile telephone wherein it comprises a single call button for communication with a central alarm point and has the capability to establish voice communication and or transfer data messages comprising a current GPS coordinate and or a voicemail message to a destination subscriber number of a fixed or mobile phone or to an IP address.

Other objects and advantages of this invention will become apparent from the description to follow when read in conjunction with the accompanying drawings.

Certain of the foregoing and related objects are readily attained according to the present invention by the provision of a novel remote asset management system and method, which serves to address the diverse requirements of industrial asset and consumer asset management and for the purposes of remote performance control and for the generation of alarm messages when the operational ranges of one or more operational parameters of the associated one or more assets exceed predetermined thresholds.

The remote asset management system preferably comprises a wireless module wherein each is associated with at least one remotely located asset and wherein each module comprises a telecommunications means to enable it to communicate using any wireless telecommunications network such as GSM, GPRS, CDMA, WCDMA, CDMA2000, WLAN, Blue Tooth and other technologies such as Infra Red and Home RF and the like.

Where appropriate, in alternative embodiments, the wireless module may additionally comprise a GPS means to enable remote tracking of the module. The wireless module further comprises a port module through which the device is able to communicate with an associated asset. In addition, the wireless module comprises a memory means to support a data processing application to communicate with the associated asset through the port module. The module either draws its power from an associated power source such as a solar cell or the power supply of the associated asset, or it comprises its own rechargeable battery and programmable power duty cycle.

The wireless module, either directly from another wireless device or from a remote system server, receives messages via the telecommunications network infrastructure for the purposes of interrogating the status of the wireless module and or the status of one or more of the associated assets.

Messages are authenticated according to access rights and each may comprise data to be sent through the port module to change the operational parameters of the associated asset.

The remote asset management system and method has direct and effective application to diverse asset management scenarios from warehouse inventory management to remote programming applications such as for programming a solid state video recorder remotely. Moveable assets such as vehicles, bicycles and freight, as well as laptops, are conveniently and effectively tracked through associating a wireless module with each asset and providing a network-based system server service-platform, which is linked to the telecommunications network infrastructure and which has the means to store and run a number of remote asset management software applications to provide diverse asset tracking and remote control solutions.

Additionally, the remote asset management solution has direct and efficacious application for the remote reading of gas and water utility meters.

The associated network-based service-platform is programmed with dedicated software application modules, each capable of managing one or more separate remote asset tracking applications. Messages can be sent to and from the service-platform between the wireless modules according to the current invention and or between other wireless devices such as mobile phones and wireless PDA devices.

Each server-based software application module is tailored to map a set of asset operational parameters to ranges of acceptable operation and the application module is further capable of generating alarm messages when data received from a particular asset indicates that it is operating outside acceptable operating ranges.

The service platform has the capability to generate data messages to be sent to the wireless module associated with a particular asset for the purposes of causing some desired change in the said asset.

Other objects and features of the present invention will become apparent from the following detailed description considered in connection with the accompanying drawings, which disclose one embodiment of the invention.

It is to be understood, however, that the drawings are designed for the purpose of illustration only and that the particular description of the chosen application of the remote asset management system and method is given by way of example only and does not limit the scope of the invention.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
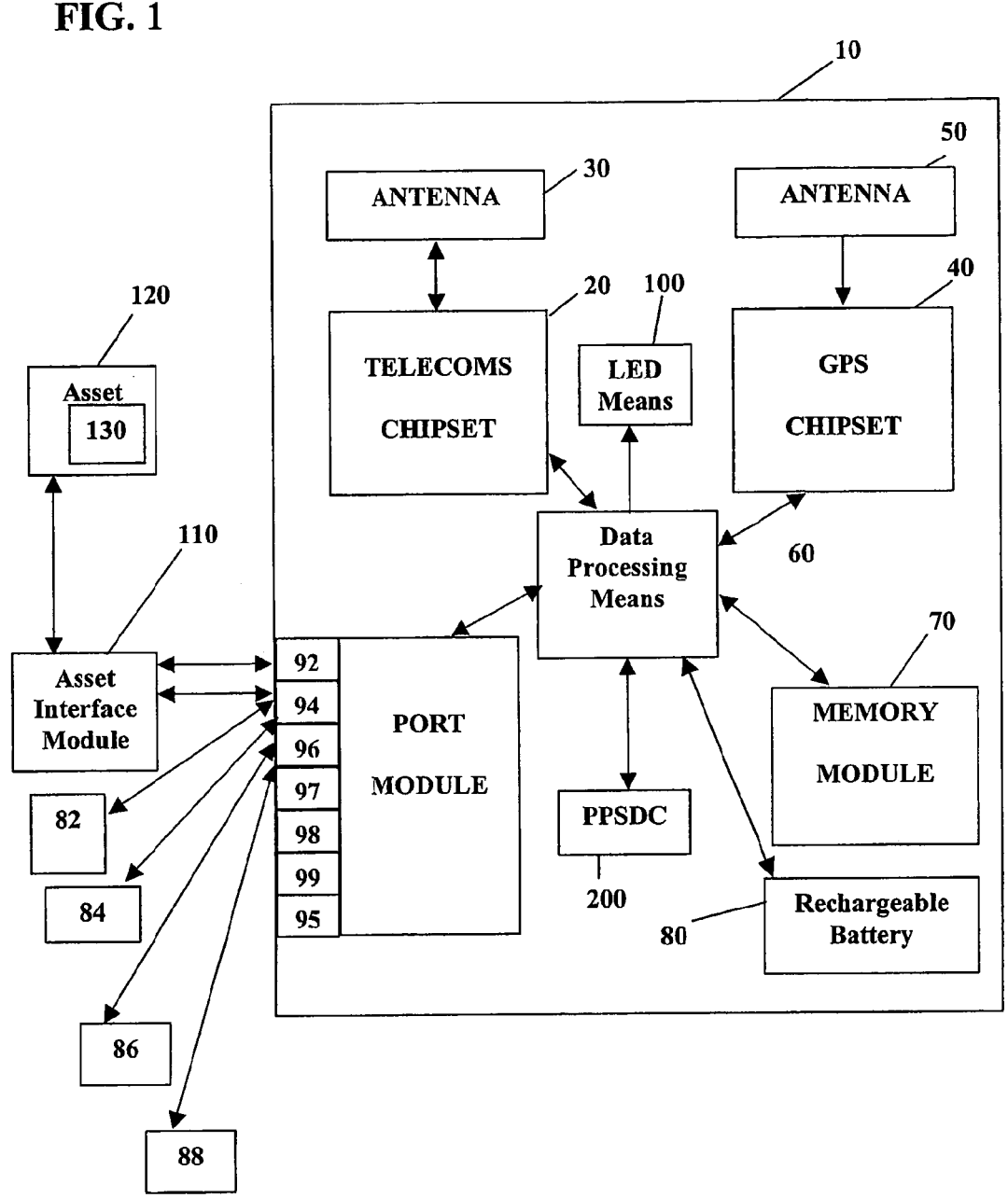
FIG. 1 illustrates a schema showing the layout of the wireless module according to the present invention.

Referring now in detail to the drawings and in particular to FIG. 1 thereof, therein illustrated is a wireless module, which forms part of the remote asset management system according to one embodiment of the present invention.

The following description makes reference to the detailed features and applications as outlined in the objects of the invention.

In FIG. 1 is shown a wireless module (10), which comprises a telecommunications chipset (20) and antenna (30), a GPS chipset (40) and antenna (50), a data processing means (60), a memory module (70), a rechargeable battery (80), and a port module (90). The telecommunications chipset (20) also comprises a ringing tone generator. A microphone and loudspeaker may be incorporated into the wireless module or a microphone and audio headset may be connected to a dedicated port in the port module (90). A light emitting display means (100) such as one or more light emitting diodes (LEDs), which indicate the status of the wireless module such as its current mode of operation. Different sequences of LEDs and different coloured LEDs may be programmed to indicate that the wireless module is functioning correctly, or is receiving data, or is retrieving data from an associated asset, to which it is connected or integrated via the port module (90).

The data processing means (60) comprises a micro-controller and a software module, which is programmed with a data processing asset management application to manage the asset through the port module (90).

The data processing application processes SMS messages received by the telecommunications chipset (20) via the antenna (30) and authenticates the incoming message against stored subscriber data in the memory module (70). Authenticated messages are further analysed for data and or for asset management instructions.

The data processing means (60) provides the capability to transform the wireless module (10) from being an end point of data or voice communication into being a programmable gateway, which is able to communicate with a range of external devices or functional elements connected via the port module (90).

FIG. 1 also shows an asset interface module (110), which is associated with an asset (120) that the wireless module is managing and which makes possible direct communication between the operational control system of the asset and or data collection system of the asset (130) and the wireless module (10).

The data processing means (60) sends data and instructions to the port module (90) for communication to the asset interface module (110). The port module (90) comprises a number of analogue and digital ports (92), a power supply port (94), a fixed line telecommunications port (96), a serial interface (97), a USB connection (98) and a laptop connection port (99). A Telecoms microphone and audio headset may be connected to the port module via a dedicated connection (95).

The analogue and digital ports (92) comprise voltage input and output lines, which can receive data from and send data to the asset interface module (110) for communicating with the asset. The power supply port (94) can receive power directly from the asset itself via the asset interface module (110) or via a separate mains power supply (82) or a separate power supply (84) such as a solar cell. The fixed line telecommunications port (96) is used to connect the wireless module to a local area network (86) or directly with the Internet (88) and it may comprise a firewall capability to prevent unauthorised access. Additional serial and USB interfaces are provided to connect different devices for different applications.

The wireless module may draw its power from one of a number of power sources (80, 82, 84, 110). To conserve power, the wireless module (10) further comprises a programmable power supply duty cycle module (200). The module (200) can be programmed to separately control the power supply to the telecommunications chipset (20) and GPS chipset (40). The GPS chipset (40) uses large amounts of power to process GPS coordinates and the telecommunications chipset (20) uses large amounts of power to maintain communication with the telecommunications network. It is therefore advantageous to provide the means (200) to power down either the GPS chipset (40) or the telecommunications chipset (20) or both whenever either of these elements of the module is not needed for position determination or for wireless communication respectively. The programmable power supply duty cycle module (200) is associated with a timing circuit and it (200) comprises the means to maintain the wireless module at a low power.

In this way the wireless module can receive and authenticate incoming messages when in an active mode which can cause the wireless module to power down for a predetermined interval into an idle mode state. During the said interval, it is not possible for the device (10) to send or receive wireless communications via the antenna (30) and chipset (20). During the said interval, it is not possible for the device (10) to process GPS data and determine its geographical coordinates.

For location determination applications, the device (10) has the capability to be programmed to store GPS data periodically according to a certain period. The data is stored in the memory module (70) for the purpose of creating a tracking log of the movement of the device. Even when there is no satellite visibility, it is often possible to communicate via mobile phone.

In such an instance, the device can be requested to send the tracking log to another wireless device or to a system server at a remote location.

The tracking log comprises a number of GPS coordinate data and the time when each data was stored. In this way the track of previously stored GPS position fixes may be used to predict the current location of the device.

The programmable power supply duty cycle module (200) is able to selectively control the power supply to all parts of the wireless module according to the pre-programmed duty cycle and also according to data received from the port module (90). The associated asset may generate an alarm condition and request that data be sent immediately to the remote system server or to some other remote device such as a wireless device or a remote device connected via the Internet. If the module is in idle mode when the alarm message is received, the data processing means (60) can communicate with the power supply duty cycle module (200) and cause the device to power up the telecommunications chipset so that an alarm message can be sent across the mobile telecommunications network to a remote wireless device. If the remote device is connected to the Internet via Internet connection port (96), then the wireless module may send an alarm message to a destination IP address without powering up the telecommunications chipset (20).

The wireless module is intended to comprise different variants wherein each variant is optimised to match the asset management requirements of each associated asset. A remote system server service platform is used to process a range of responses sent by the wireless module.

In a first embodiment, the service platform communicates using SMS messages wherein each comprises a string of up to 160 characters. It will be apparent that the server platform may also and alternatively comprise another wireless module, which is able to serve as a master wireless module to supervise the asset management operations of one or more slave wireless modules.

The data processing means (60) provides the capability to transform the wireless module (10) from being an end point of data or voice communication into being a programmable gateway, which is able to communicate with a range of external devices or functional elements connected via the port module.

Figure 2:
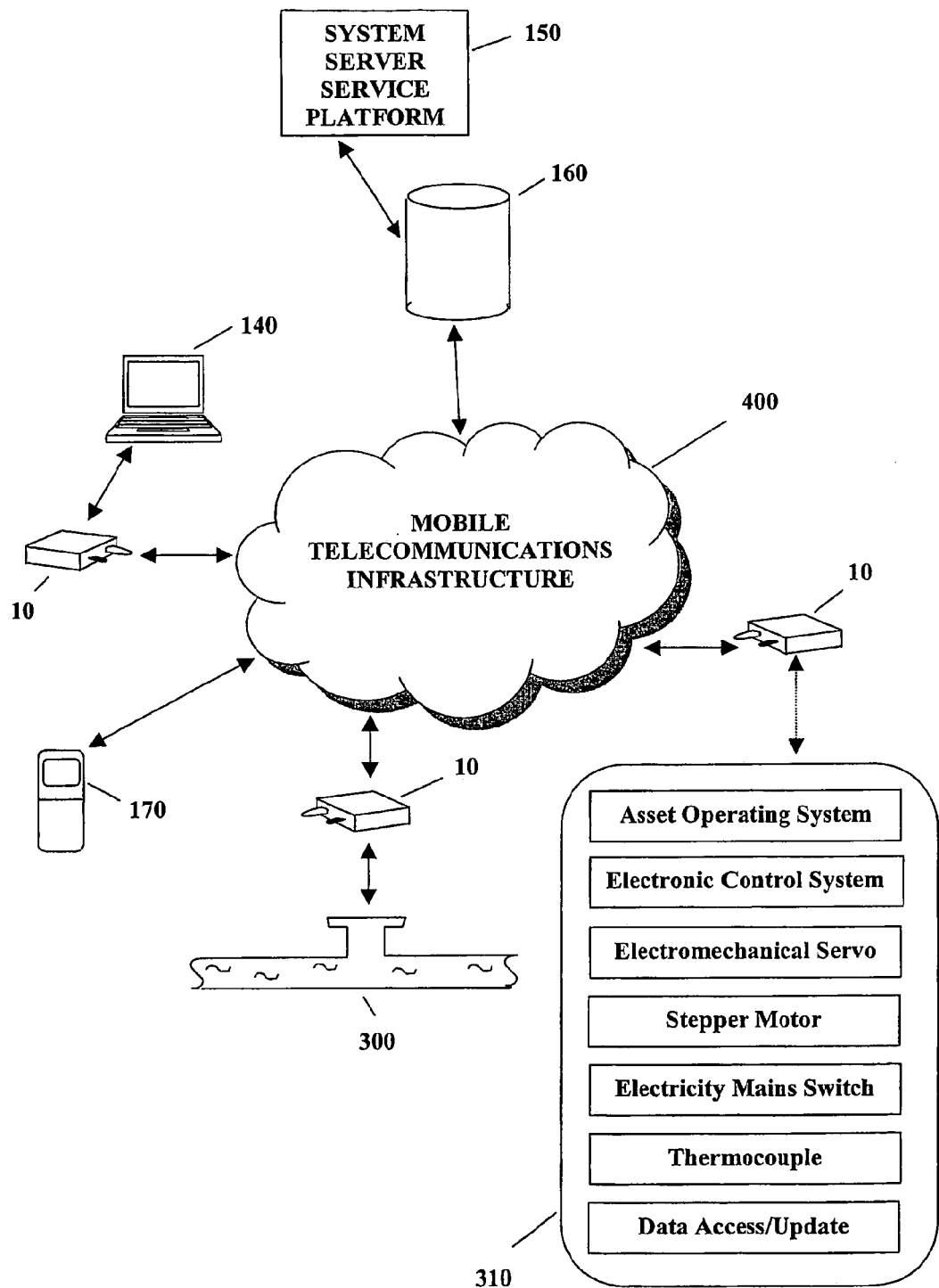
FIG. 2 illustrates a schema showing an example of a number of the applications controlled by the wireless modules according to the present invention.

FIG. 2 illustrates the different applications controlled by the wireless module in the particular example where the mobile telecommunications network operates according to the GSM standard. It will be clear to those skilled in the art, which changes must be made to the wireless device and to the messaging protocols in order for the system and method of the current invention to operate according to other telecommunications systems and standards such as for example GSM GPRS, CDMA 2000 and WCDMA.

In more detail, FIG. 2 illustrates the use of the asset management system according to the current invention. Each wireless module (10) comprises the capability to communicate via the mobile telecommunications infrastructure (400). A mobile phone or message-enabled wireless terminal (170) can communicate with a specific wireless module (10) or with a system server service platform (150) via a point of interconnection (160) with the mobile telecommunications infrastructure (400).

For asset management applications, which comprise a small number of wireless modules (10), it is possible to manage these using a laptop PC (140).

The wireless module (10) is capable of controlling many system operation variables of the associated asset such as an asset operating system, an electronic control system, an electromechanical servo, a stepper motor, an electricity mains switch, a thermocouple and a means to access or update data (310).

The wireless module has the capability to be integrated with a utilities meter such as a water flow meter (300) wherein water usage data can be remotely accessed from the wireless module integrated with the utility meter and forwarded to the water board.

In the example of GSM, FIG. 2 illustrates that communications can be sent to the wireless module, either directly from any compatible wireless device having SMS capability or via a message-processing system-server service-platform. For each specific asset management software application, a separate asset management service is operated by the service-platform. All parameters defining and controlling the operational characteristics of each managed asset are stored and controlled by a specified asset management software application. In addition, ranges of acceptable operating conditions are also stored and controlled by the said software application such that alarm conditions are established when any operating conditions move outside any of the corresponding acceptable ranges of operation.

The remotely located system-server service-platform receives data relating to any specific remotely located asset either directly from the wireless module in response to a status request interrogation message sent to the wireless module associated with the said asset or periodically and automatically according to a predetermined and pre-programmed data generation period. In addition, the service platform also receives data describing an alarm condition in the case when the associated asset moves outside the acceptable range of operating conditions and generates an alarm to be sent to the wireless module, or the wireless module itself determines that an alarm conditions exists. Depending upon the complexity of the asset monitoring application, either the wireless module establishes the alarm condition, or the associated asset informs the module of the alarm condition.

Communications between the associated asset and the wireless module are consequently periodic, or in response to a received wireless data message such as an SMS message, a data call, or a packet data message such as GPRS, or in response to a fixed line data message such as a stream of IP packets in the instance where the wireless module may be additionally connected to the Internet via one of the port module interfaces, or when a functional element generates an alarm condition.

To further understand the actions performed by the data processing means (60) of FIG. 1, in one preferred embodiment, which makes use of SMS messaging, the data processing application contained within the data processing means (60) comprises the following functional capability.

1. A Reprogrammable Permitted Callers List wherein incoming SMS messages comprising a security code and a permitted subscriber number and a subscriber preference number enable the module to build up and store a list of permitted numbers in the order of descending preference number.

2. A reprogrammable call reject feature wherein incoming calls must be in "own number sending" mode and are checked against a look-up table and are rejected if they are not stored in the "permitted callers" list.

3. A subscriber "reselect if unavailable" feature wherein if the call is not established within a default period or if the dialled number is engaged, the module reselects the next number on the 'permitted callers" list.

4. A wireless data message translation feature wherein incoming SMS or data call messages are validated as having come from callers on the "permitted callers" list and then further processed to verify that the calling subscriber, also known as the A subscriber, is authorised to access each of any specified data that the said SMS message is requesting access to, or is authorised for directly communicating with one or more of the designated externally-connected asset control systems, or is authorised to access the current GPS coordinate data or to any stored data such as the stored GPS data.

5. A non-permitted caller ID store feature wherein calls and messages originating from an A subscriber not on the permitted callers list will be stored in a "non-permitted callers" list. Furthermore, all calls and messages from an "A subscriber" with "own number sending" switched off are automatically rejected. To avoid storage of spam advertising messages, the content of the rejected message may not be stored.

6. A reprogrammable port module processing function wherein each of the analogue and digital input lines which connect the wireless module to one or more of the assets via each asset's interface module (110) is able to be addressed by the data processing application such that data may be read and processed by the application. For each of the externally connected assets there exists a programmable sub-application which directly maps the range of data values generated by the asset operating system to a range of status conditions such as "normal operation", "alarm condition", "change in operation" and the like.

7. A number of programmable sub-applications wherein each sub-application comprises a set of data attributes which enables the wireless module to read data from and write data to the asset interface module (110) or to read data from the GPS chipset or from the GPS stored data. The sub-application further specifies reprogrammable access rights to one or more of the data attributes associated with the external asset or to the GPS stored data.

8. An alarm condition in the programmable sub-application wherein for each of the sub-applications, there exists a programmable alarm feature, which generates a message if the data values generated by the associated assets are outside operating conditions.

For each alarm condition there exists an associated "B-Subscriber" to which the message is directed, or an associated E-mail address as well as a pre-programmed alarm message. User-definable alarm messages and status messages are stored in a specific memory block and map to specific data ranges read from the port module. For different alarm conditions there exists a link to the "reselect if unavailable" feature.

9. A data-access-feature in the programmable sub-application wherein for each sub-application, there exists a data-access-feature, which enables a permitted "A subscriber" to access real time and or stored data for one or more sub-applications.

10. A stored data profile feature wherein for particular applications, such as those monitoring a range of data values changing with time, the wireless module comprises sufficient memory for the particular application to enable it to store a user-definable set of data values.

The set of data values may be accessed by a permitted "A subscriber" and sent by SMS if less than 160 characters or by data call if the data set is large. The incoming "A-subscriber" message indicates the number of stored data values requested, and or the range of time during which the data values were stored, as well as the preferred data reply format.

11. Application monitoring feature wherein the data processing application (DPA) generates a real time set of data values indicating the status of all external assets controlled by the DPA such that a laptop PC or the like can be connected directly to one interface of the wireless module so that its functionality and real-time operation can be visualised.

Note that it is well within the functionality of the wireless device to be programmed to dial up a dedicated connection in the case that a data call must be made or to establish a voice connection. Furthermore, voice recognition software may be stored in the wireless device and used to control certain functionality of the asset management process. A dedicated voice link may be made to a remote server to enable a person at a remote location to speak into the voice channel, which is subsequently received and processed by the voice recognition software in the wireless module and linked to a specific asset management task such that voice commands may cause remote asset management tasks to occur.

When the wireless module (10) is receiving messages or generating alarms, the wireless module provides a real-time visualisation of its operation. A series of LED diodes of different colours and or of different illumination sequences, enable a user to verify that the module is functioning correctly without needing to connect a PC to the PC interface in the port module. The LED diodes show simple functionality conditions such as:

1. Call-reject wherein a red diode is illuminated for 1 second;
2. A-Subscriber recognised and message accepted wherein a green diode is illuminated for 1 second.

The following conditions may have different LED responses:

3. Data-Access permitted;
4. Data Access not permitted for recognised A-Subscriber;
5. Reprogramming of linked subscriber number;
6. Self-Check of unit;
7. Access Confirmation to programmed external functional elements;
8. Alarm condition;
9. GPS coordinate generated;
10. GPS coordinate read from last stored entry due to no GPS position fix currently available;
11. Module within base station coverage;
12. Module outside base station coverage.

In an alternative embodiment the wireless device may comprise a fibre optic display such that the LED display may be replaced or complemented with one or more rings of light emitting fibre to generate rings of light of different diameters and patterns and colours to differentiate the above list of functionality conditions. Alternatively, the wireless device may be complemented with coverings of light emitting polymers, which are capable of generating diverse and multicoloured smart-skin effects, wherein the patterns for each may be controlled by the data processing means.

The wireless module comprises the capability for a personal computer such as a laptop PC to be directly connected to it via a dedicated port for detailed visualisation of its real-time processing capability and for reprogramming purposes. Sufficient application security such as an exchange of coding keys between the DPA and the attached laptop exists at the laptop interface to prevent unauthorised access of the data.

For remote, hard-wired access, the data processing application has the capability to run a virtual private network (VPN) programme end-to-end between the wireless module firewall and a remotely located device connected to the Internet.

The laptop PC software will comprise pull-down menus to access the real-time data available to the data processing application such as data values returned by each interface in the port module and stored data values based upon a specific data storage period and maintained for a specific time window for example, the last 60 data values, stored per minute, where new data replaces the first stored entry.

For different applications of the wireless module, the laptop PC connected via the port module (90) comprises a specific script-based software to enable a user to program specific cause-effect functionality into the said module. In this way a user can build an application on the laptop PC and upload this to the module.

To assist with the application development and for visualising the real-time functionality of the wireless module, the laptop PC connected via the port module (90) shows a screen-shot depicting the processing and data storage functions being performed by the wireless module.

The following application monitoring details are present on the screenshot of the wireless module:

1. A wireless module self check status which includes a list of the features of the wireless module and the memory size available to different associated assets for periodic data storage;
2. A port module self-check status, which comprises a list of the current standard, interfaces in the port module and the current data values of the voltages on each;
3. A stored data values, which comprises a table which can convert to a simple graphic of stored data values for the associated assets and a table of the previously determined GPS coordinates, indicating periodicity and over which time data values were stored;
4. A permitted callers' list, which comprises a reprogrammable and hierarchical list indicating the B-subscriber number and or the IP address to which the wireless module will call or send data messages to. This list also specifies the status of permitted callers and the access rights to particular associated assets and to the stored data;
5. An access code list, which comprises a list of different user-definable SMS access codes, which must be included within each SMS message for access/control of different features of the module or for access/control of any associated asset;
6. An associated asset functional description which describes the functionality of the attached device;
7. A status message list which comprises a list of user-definable messages which relate to the ranges of parameters monitored by the DPA of the externally attached associated asset, which include alarm condition messages as well as current operational messages and intervals of time that a specified monitored associated asset has been working within an acceptable operating range;

8. A power supply status, which shows whether the module is currently being powered by the external device or whether it is drawing power from its own battery, as well as the power level of the rechargeable battery.

Other asset features, which are specific to a particular application of the wireless module, will also be included in the screenshot.

In a second embodiment of the same invention, particular details of the system and method according to the application to vehicle guidance systems are now described in more detail. As mentioned, the wireless module has the capability to receive and store data for the purpose of updating data stored in the memory of an associated asset. In the particular example of the GPS vehicle guidance system, the in-vehicle GPS system calculates a position fix from the transmissions received from a number of satellites in the moving constellation of GPS satellites. This position fix is computed in the form of a geographical coordinate and compared with the coordinate-encoded map data in the vehicle guidance system. In order for the system to be useful, the map data must be up to date. According to the invention, as new roads become opened and knowledge becomes available of planned road works, it is advantageous that this data is transmitted using the mobile network infrastructure in the form of messages sent to the wireless module. In addition, statistical information about traffic congestion at specific times of the day and during the year can be forwarded to the wireless module associated with the in-vehicle GPS system. Such data may be communicated using messages, such as the GSM SMS message protocol, or via GPRS, at times when the network is least congested such as at night.

Real-time updates such as slowing of traffic flow rates, traffic jams, and accidents, and changes in driving conditions due to adverse weather conditions may also be communicated using the same system and method.

Drivers could, for example, request traffic information about their current intended route from a remote server connected to the mobile network infrastructure using the wireless module to request real-time information by sending the coordinate details of the planned route as calculated by the in-vehicle system. Alternatively, and with particular reference to this application, it is advantageous to describe an auxiliary system and method, which falls within the scope of the current invention.

While it is effective and efficient to communicate slowly changing route data to update the roadmap data in all route-guidance systems, it is less efficient to send real-time data, which describes traffic congestion events of short duration, to all drivers when such data only impacts drivers who are currently in or near the location of the said event at the time it occurs.

It is possible for a remote system server to interrogate the in-vehicle wireless module GPS data and then react by transmitting real-time congestion data back to those vehicles in the vicinity of each event.

However, the auxiliary system and method according to this application of the invention is more appropriate.

The infrastructure for communicating traffic news to drivers is well established in many countries. Moreover, it is developed to the extent that drivers generally receive information, which relates to the area through which they are travelling. Many drivers listen to FM public radio broadcasts from local radio stations while travelling. Moreover, certain of these car radio systems comprise appropriate functionality such that traffic congestion announcements can periodically interrupt these local broadcasts to inform the driver of areas of traffic congestion or adverse driving conditions due to an accident or bad weather. In this way, drivers who are travelling in the vicinity of the said congestion events can receive meaningful traffic congestion announcements.

In addition to these known systems, many Frequency Modulated FM public radio broadcasts comprise digital information such that simple advertising messages appear on the car radio display. This capability is not presently used as a means to transmit traffic congestion information. The auxiliary system and method involves making use of the interrupting traffic announcement broadcasts and the capability to encode radio broadcasts with data.

The auxiliary system and method according to the invention makes use of these traffic announcements in such a way that the public radio station traffic announcements are modified to comprise encoded data messages incorporated into the radio transmission, which describe details of the event in a way that they can be utilised by a vehicle guidance system. The said encoded data messages are received and decoded by a separate FM decoding device, which is enabled to receive traffic announcement broadcasts, wherein said FM device is associated with the wireless module according to the invention, or wherein the wireless module comprises such an FM decoding means, or wherein the said encoded data messages are decoded and output by the car radio itself and sent to the wireless module or directly to the associated in-vehicle navigation system, such that real time traffic information can be transmitted to the in-vehicle navigation system.

In this way, the auxiliary system and method makes it possible for the wireless module according to the invention to update an associated in-vehicle GPS car navigation system with map data and localised real-time data relating to traffic congestion events. The said navigation system is thus able to make use of this additional information and guide drivers away from traffic queues due to an accident or other congestion event. The on-board system could process the information and if it impacted the planned journey route, the system could issue an alarm and request that the driver turn off the current road according to the normal practice of using such vehicle guidance systems.

Figure 3:
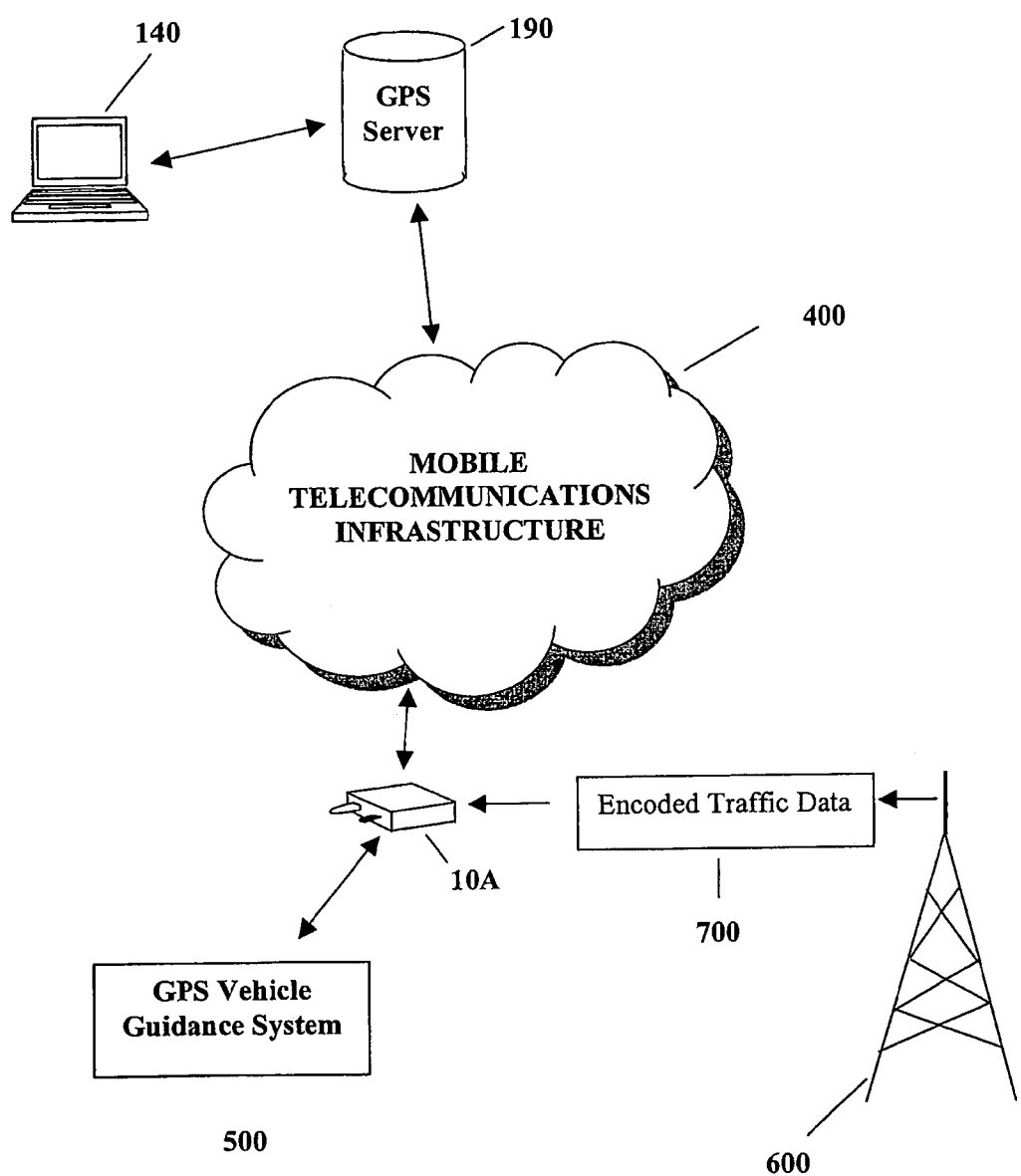
FIG. 3 illustrates a schema showing the remote asset management system according to one embodiment of the invention.

With particular reference to FIG. 3, the illustration indicates the communication paths of the different types of data. A GPS data server (190) supervised by a computer system such as a laptop PC (140) is connected to the mobile network infrastructure (400). The GPS data server (190) has a list of the subscriber numbers of each of the wireless modules (10A) associated with each in-vehicle GPS vehicle guidance system (500). GPS data updates can be sent from the GPS data server (190) via the mobile network infrastructure using telecommunication messages to the wireless module (10A) associated with the GPS vehicle guidance system (500).

Real-time traffic data is sent by local FM public radio station traffic broadcasts. In one embodiment, the wireless module (10A) comprises additional functionality of a traffic announcement enabled FM chipset. As mentioned earlier, this functionality may be external to the wireless module or a separate FM car radio may be used to decode the FM broadcasts.

It will be obvious to those skilled in the art to apply this system to emergency service vehicle applications wherein each vehicle comprises the wireless module according to the invention and wherein real-time event data can be communicated via SMS, or to all vehicles over a common radio broadcast channel. Correspondingly, such an application falls within the scope of the current invention.

It is to be understood that not all interfaces will be present on each and every module according to the present invention and choices of the different interface types are made according to the particular asset type and the asset interface (110). Furthermore, the specific functional split of the total functionality of the wireless module across the particular elements is given by way of example only and that different variants of the design are possible which integrate different processing capabilities of the module with different hardware elements. For example, the asset interface (110) itself may further comprise a processing means, which is capable of processing data generated by the asset operating system or asset data collection scheme.

For example, in the application of the wireless module to utility meters, the communication channel from the asset (120) to the wireless module (10) via the interface (92) may comprise sending data only.

In particular, and in accordance with the scope of the invention, the data processing means (60) may exist as a single separate module or exist as a number of functional software elements, spread out among different parts of the module. The wireless module itself may comprise a programmable software radio module instead of a specific dedicated Telecoms chipset.

As described earlier, the wireless module (10), which may incorporate a telecoms chipset according to the GSM standard, may, in one embodiment, make use of SMS messages to effect asset management of an associated asset. The following description gives an example of an SMS message format, which can be used to achieve the objects of the invention. It is to be understood, however, that this is only one example of many which may be used, wherein each may be adapted to suit each different application.

The wireless device is designed to process SMS messages according to a predetermined format. The DPA means (60) performs the processing of the incoming SMS message. The format may comprise the following:

1. A 160 character message comprising a coded identifier such as an identification code and or including data describing from which originating device the message was sent such as that sent by a mobile phone in "own number sending" mode;
2. The message further comprises an authorisation code, which may be different to provide different levels of access to data stored by the device.
   a. A first level of access may represent authorisation to change the default subscriber number that the device communicates with in the instance of an alarm;
   b. A second level of access may represent authorisation to access the GPS data stored by the memory module (70);
   c. A third level of access may comprise two or more codes wherein the first represents authorisation to access different functionality of an associated asset and the second and additional codes define the specific functionality which may be accessed and changed.
3. The message further comprises a data block which specifies the particular asset management tasks performed by the wireless module upon the associated asset such that data is read from or sent to a specific functional element within the associated asset via the port module (90) for the purpose of determining the status of that functional element or for effecting change in that functional element.

The data processing means is fully programmed with the capability to communicate with each and every functional element within the associated asset. The specific data describing the operating system of the associated asset and data which relates to the method by which asset data is accessed and read by the wireless module (10), following authentication of the sender of the message and validation of the access authorisation, is stored in the memory module and is available to the data processing means (60).

Consequently, each coded message comprises a predetermined format which is fully processed by the data processing means (60) with reference to the stored data in the memory module (70) and, in the case that the message is authenticated and authorised, the data component of the message is processed to access data from a specific memory location of the wireless module or associated asset and or to effect a specific change in the said wireless module or associated asset. In this way the data processing means (60) and the controlled access of information through the port module (90) are key to the system and method of the invention.

Figure 4:
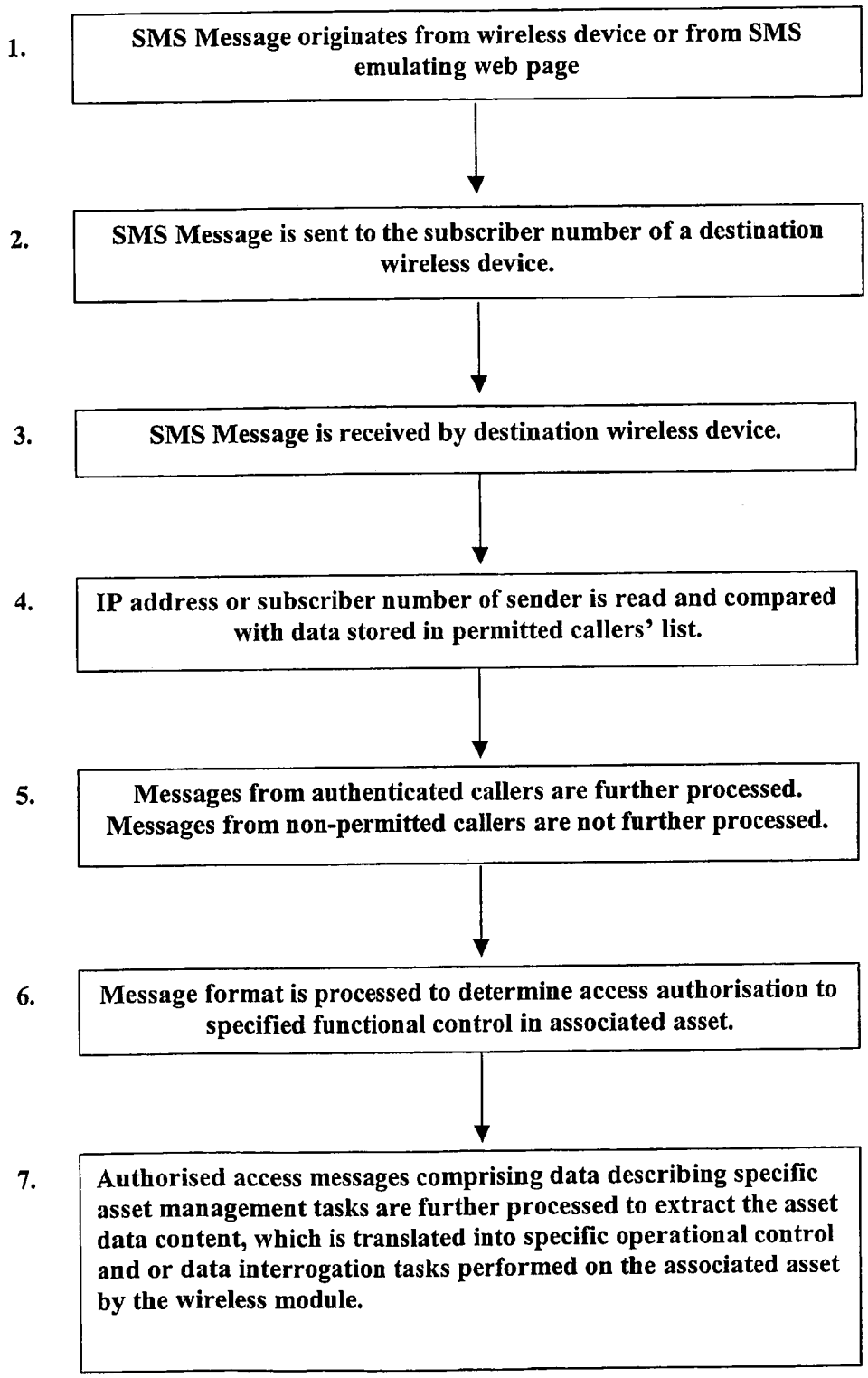
FIG. 4 illustrates a schema showing a flow diagram of how a message may be sent and systematically processed by the wireless module according to the system and method of the present invention.

FIG. 4 illustrates 7 steps how an asset control message may be authenticated and authorised to control some functionality of an asset associated with the wireless module (10) according to the current invention.

With reference to the preceding description, it will be clear to those skilled in the art that the level of authentication and or authorisation will be directly related to the particular asset management application.

In more general terms, the invention provides a solution for switching off devices remotely and rendering them inoperable, such as laptop computers and thereby preventing unauthorised access of stored data. In other situations, the operational characteristics of the asset, such as a car engine performance, can be monitored remotely, and provided to a vehicle service centre for analysis. Moreover, the same in-vehicle module can provide positional information, by way of an integrated Satellite Navigation Global Positioning System chipset, as well as affording the capability to lock down the vehicle control system when the vehicle is stationary.

In other applications such as where a wireless module can be used to communicate with a server, or where a system server is connected to the mobile telecommunications infrastructure the same server based remote asset management system can provide consumer services such as the means to program solid-state digital video broadcasting DVB-T recorders.

In such a service, for example, a consumer can register the make and model of their solid-state video broadcasting device and their interest in a certain type of television programme with the network-based server. At any time during the day, the consumer may receive a data message on a mobile phone or via E-mail indicating that a potentially interesting programme will be broadcast, and the request whether the network based server should communicate data instructions to the wireless module associated with the digital video recorder to record the broadcast. For example, the consumer need only reply with a simple message and the network-based server can proceed to compile and communicate the complex data message to the wireless module associated with the said recorder.

In the area of remote facilities management, the remote asset management system provides a solution for an improved fire alarm and home security network for communicating directly with homeowners or directly with the emergency services in the case that there may be a fire at the location or when an unauthorised intruder has been detected.

Furthermore, the same wireless local area network can be extended for the remote control of diverse consumer devices. A wireless telecommunications based fire alarm provides the means to achieve intelligent fire surveillance in areas where only radio network coverage is possible such as in remote areas where no fixed telecommunications infrastructure is present.

In addition to the provision of network-based remote asset monitoring systems, the invention also provides a telecommunications solution for determining the location of sought assets as well as the authentication of assets, vehicles and persons.

The invention may make use of the existing wireless telecommunications infrastructure such as that operating according to the GSM Telecoms standard or the WCDMA Telecoms standard as well as the pager network.

The module-server architecture operates seamlessly and transparently with the existing wireless networks, thereby making the remote asset management service available wherever there is wireless network coverage.

Furthermore, the invention may make use of the text message service provided by the wireless telecommunications networks such as the Short Message Service in GSM. In this way, asset management commands can be sent easily and efficiently between each wireless module associated with the asset and the network-based server. Moreover, the choice of SMS enables any person who is authorised to communicate with the asset, to communicate with the network server and or the asset wireless module from an SMS-enabled mobile phone, an SMS-enabled wireless PDA, or via an SMS-message despatch internet website.

The Short Message Service (SMS), as defined within the GSM digital mobile telecommunications standard has several unique features:

A single short message can comprise up to 160 characters of text in length. These 160 characters may comprise words or numbers or an alphanumeric combination. Non-text based short messages (for example, in binary format) are also supported and these may be used for ring tones and logos services for instance.

The Short Message Service is a store and forward service where short messages are not sent directly from sender to recipient, but are always sent via an SMS Centre instead. Each mobile telephone network, which supports SMS, comprises one or more messaging centres to handle and manage the short messages.

The Short Message Service features confirmation of message delivery. Unlike paging, users do not send a short message and trust and hope that it gets delivered. Instead, the sender of the short message may receive a return message back notifying them whether the short message has been delivered or not.

Short messages may be sent and received simultaneously with GSM voice, Data and Fax calls. This is possible because whereas voice, Data and Fax calls occupy a dedicated radio channel for the duration of the call, short messages are transmitted using the signalling channel. As such, users of SMS rarely, if ever, get a busy or engaged signal as they can do during peak network usage times.

Ways of sending multiple short messages are available. SMS concatenation (stringing several short messages together) and SMS compression (getting more than 160 characters of information within a single short message) have been defined and incorporated into the GSM SMS standards.

To use the Short Message Service, subscribers require the relevant subscriptions and hardware, specifically:

A subscription to a mobile telephone network, which supports SMS;

The use of SMS must be enabled for that user (automatic access to the SMS service is given by some mobile network operators, others charge a monthly subscription and require a specific opt-in to use the service);

A mobile phone, which supports SMS;

The knowledge of how to send or read a short message using each subscriber's specific model of mobile phone;

A destination subscriber number or IP address to where a short message is sent, or from where a short message is received. This may be another mobile phone, a fax machine, a PC or via an SMS emulating website Internet address.

Many different types of mobile networks support the use of SMS.

Since its inclusion into the GSM standard, SMS has also been incorporated into many other mobile phone network standards, including the Nordic Mobile Telephone (NMT), Code Division Multiple Access (CDMA) in North America and Personal Digital Cellular (PDC) in Japan. Each of these standards implements SMS in slightly different ways and message lengths do vary. The availability and characteristics of SMS on different mobile network standards is now quite widespread.

SMS is fully available on GSM900 MHz, GSM1800 MHz, and GSM1900 MHz, for message lengths up to 160 characters. SMS is also available on the analogue NAMPS system of North America, and the CDMA system of North America but with an increased message length of 256.

US TDMA and D-AMPS of North America also have SMS. In Japan, both the Personal Handyphone System (PHS) and the Personal Digital Cellular standard PDC have SMS capability.

The system and method according to the invention may be thus implemented on US TDMA networks (IS-136), CDMA networks (IS-95) and all GSM networks. In addition it may be used wherever IDEN or an Integrated Digital Enhanced Network is in operation, which is a TDMA-based digital network standard, which supports up to 140 character SMS messages.

In addition to these applications where SMS capability forms part of the existing voice and data mobile telephone infrastructure according to the previously specified standards, the system and method according to the invention is equally suitable for GPRS packet radio networks and 3rd generation networks. In addition, wireless Application Protocol, or WAP technology, may be used to build server-based messaging applications.

Pager messaging networks may also be used as the messaging carrier infrastructure instead. In all cases, persons skilled in the art will be familiar with the necessary changes, which must be made to the wireless module Telecoms chipset (20) and the software operating on the data processing means (60). Instead of a reprogrammable power supply, a wireless module may comprise a NICAD battery to provide sufficient power to be able to send a message or establish a dedicated voice channel to another wireless device.

The present invention may be used in a diversity of applications and environments. In particular, the application of advances in messaging such as EMS (Enhanced Messaging Service) and MMS (Multimedia Messaging) are fully within the scope of this invention. For example, a multimedia message comprising a graphic image may be generated by an MMS enabled wireless module to transmit stored data in a graphic form. Furthermore, it should be understood that the present disclosure is for the purpose of illustration only and does not include all modifications or improvements, which may fall within the scope of the appended claims.

What is claimed is:

1. A remote asset management system comprising:
   at least one programmable wireless module, each having an antenna and an identification module and configured to communicate via a radio communication protocol;
   a plurality of assets each linked to one of the programmable wireless modules;
   a remote system server service platform configured to receive remote asset data from at least one of the programmable wireless modules, send messages to at least one of the programmable wireless modules, monitor the programmable wireless modules by requesting and receiving current mode information, and remotely program the programmable wireless modules to control an operational status of the linked assets; and
   a data processing module located within the at least one programmable wireless module and configured to process at least one message received by the programmable wireless module, authenticate whether said at least one message was sent by a permitted server service platform, analyze authenticated messages, and carry out asset management instructions included in the at least one message, thereby controlling the operational status of the linked asset.

2. The remote asset management system of claim 1 wherein each of the at least one programmable wireless modules further includes an indicator configured to represent the current status of operation.

3. The remote asset management system of claim 1 wherein the remote system server service platform further includes program code for remotely initiating at least one of said programmable wireless modules by sending to said data processing module of each said programmable wireless modules a unique encrypted code to allow said remote system server service platform to put each of said programmable wireless modules in a programming mode.

4. The remote asset management system of claim 1 the system further comprising:
   a memory module for storing permitted caller data for use by the data processing module in authenticating whether said message was sent by a permitted server service platform.

5. The remote asset management system of claim 1 wherein each of the at least one programmable wireless modules further includes a solar cell.

6. The remote asset management system of claim 1 wherein each of the at least one programmable wireless modules further includes a display.

7. The remote asset management system of claim 1 wherein communications are encoded and/or encrypted.

8. The remote asset management system of claim 1 wherein each of the at least one programmable wireless modules are configured to connect to a plurality of external devices using of one or more of the following interfaces: an analogue port, a digital port, a power supply port, a fixed line telecommunications port, a serial interface, a USB connection, a computer connection port, a PCMCIA PC card port, a Fire-Wire connection, a SCSI port, a hard disk drive port, an ultra sound port, an infra-red port, an internet connection port, a local area network connection, a microphone connection, an audio headset connection, a communications port connected to a remote asset interface module and configured to communicate with one or a plurality of said fixed or mobile assets via a wired or wireless connection.

9. The remote asset management system of claim 1 wherein each of the at least one programmable wireless module is programmable gateways configured to communicate with the plurality of assets via a fixed or wireless connection.

10. The remote asset management system of claim 1 wherein each of the at least one programmable wireless module is configured to directly communicate over a fixed or wireless connection with a data collection system within the linked asset.

11. The remote asset management system of claim 1 wherein the remote system server service platform further includes a wireless module configured to serve as a master module and supervise asset management operations of the at least one programmable wireless module, wherein each of the supervised programmable wireless modules are configured to operate as slave wireless modules.

12. The remote asset management system of claim 1 wherein each of the at least one programmable wireless module is configured to receive communications directly from a local or remote wireless device or from the system server service platform.

13. The remote asset management system of claim 1 wherein each of the at least one programmable wireless module is further configured to gather and process data received from the corresponding linked asset and communicate with the remote system server service platform.

14. The remote asset management system of claim 1 wherein the remote system server service platform is a dedicated network server programmed with operational details of the plurality of assets, the dedicated network server configured to manage communication messages sent to and received from the at least one wireless module.

15. The remote asset management system of claim 1 wherein the remote system server service platform is an Internet-based server programmed with operational details of the plurality of assets, the Internet-based server configured to manage communication messages sent to and received from the at least one programmable wireless module.

16. The remote asset management system of claim 1 wherein the remote server is pre-programmed to store operational data for one or more types of assets, wherein the data is at least one selected from the group consisting of: asset type, asset model number, asset operating system type, asset power supply type, back-up battery supply, power supply duty cycle parameters, critical parameters for disabling specific functionality of the asset, location data of the asset as a function of time and stored at specified intervals for a specified duration, asset performance monitoring parameters, service history of the asset, location history of the asset, performance optimization parameters, and security lock-down features.

17. The remote asset management system of claim 1 wherein at least one of the plurality of assets is an in-vehicle navigation system integrated with a broadcast receiver and configured to broadcast received traffic data broadcast over a radio channel, wherein the programmable wireless module associated with the in-vehicle navigation system is further configured to receive, decode, combine the traffic data with pre-processed route information, update the route, and generate instructions advising the driver of the change in route, wherein received traffic data includes at least one of one of congestion data, accident data, and changes in driving conditions.

18. The remote asset management system of claim 1 wherein each of the at least one programmable wireless modules includes a software radio module.

19. The remote asset management system of claim 1 wherein the system server service platform is further configured to process communications from the at least one programmable wireless module to determine the location of the at least one programmable wireless module.

20. The remote asset management system of claim 19 wherein each of the at least one programmable wireless modules further includes a GPS processing module.

21. The remote asset management system of claim 20 wherein the at least one programmable wireless module is configured to store at least one GPS location.

22. The remote asset management system of claim 21, wherein the at least one programmable wireless module is configured to store the at least one GPS location periodically.

23. The remote asset management system of claim 21, wherein the at least one programmable wireless module is configured to store the at least one GPS location in response to a change in status of a monitored interface.

24. The remote asset management system of claim 21, wherein the at least one programmable wireless module is configured to store the at least one GPS location in response to a request received from a remote device and/or the system server service platform.

25. The remote asset management system of claim 1 wherein each of the at least one programmable wireless module is configured to be remotely programmed with asset management applications.

26. The remote asset management system of claim 25 further comprising a computer for developing the asset management applications and for uploading the asset management applications to each of the at least one programmable wireless module.

27. The remote asset management system of claim 25 further comprising a computer for developing the asset management applications, the computer connected to the at least one programmable wireless module over a fixed or wired connection to enable processing and data storage functions of the at least one programmable wireless module to be visualized during development of the application, wherein each asset management applications include a software program having specific cause-effect functionality.

28. The remote asset management system of claim 25 wherein each asset management application comprises a software program having specific cause-effect functionality which can be connected to a computer and wherein at least one application monitoring detail can be visualized on a screen wherein said at least one application monitoring detail may include at least one from the group consisting of module self check status, list of the features of the wireless module, memory size available to different associated assets for periodic data storage, port module self-check status, list of the current standard interfaces in the port module, current data values of the voltages at each interface, stored data values, table or graphic of stored data values for the associated assets, stored GPS coordinates, periodicity of stored GPS data, list of times for each stored GPS value, a permitted callers list of telephone numbers or IP addresses, an access code list, list of user-definable access codes to be included within each management message for access/control of different features of the module or for access/control of any associated asset, an associated asset functional description, a status message list comprising a list of user-definable messages, list of ranges of parameters monitored for the associated asset, list of alarm condition messages, list of operational messages, data showing intervals of time that a specified monitored associated asset has been working within an acceptable operating range, a power supply status, data showing whether the module is currently being powered by an external device or whether it is drawing power from its own battery, the power level of the rechargeable battery, application-specific asset features, service history, enabled or disabled asset functionality, location data, location history, performance optimization data, and security lock-down features.

29. The remote asset management system of claim 25 wherein each of the plurality of assets includes a programmable sub-application configured to directly map a range of data values generated by an asset operating system to a range of status conditions.

30. The remote asset management system of claim 29 wherein each programmable sub-application comprises a set of data attributes configured to enable the wireless module to read data from and write data to the asset interface module and/or to read data from the GPS chipset or from the GPS stored data and/or to further specify reprogrammable access rights to one or more of the data attributes associated with the asset or to the GPS data.

31. The remote asset management system of claim 1 wherein each of the plurality of assets may be at least one selected from the group consisting of: a vehicle, a vehicle engine management system, a parking meter, a highway sign, a camera, a water meter, a gas meter, an electricity meter, a bank cash withdrawal machine, a video recorder, freight in transit, a door lock, a window lock, a computer, a consumer device, a household device, a heating system, an air conditioning system, a solid state recorder, a sauna heater, a central heating system, a highway speed indicator, a packaging container, a briefcase, a laptop computer, a workstation, a fire alarm, a mains powered device, a mobile phone, a bicycle, a network device with a firewall, a GPS navigation system, a home security network, a building automation system, a burglar alarm, a refrigeration device, a temperature regulation device, an electronic key control device, a door opening device, a panic hardware device, a smoke detection device, a fire detection device, a false alarm protection device, an air filtering system, an elevator, and a fan system control.

32. The remote asset management system of claim 31 wherein the remote system server service platform is configured to exchange encoded and/or encrypted messages with at least one of the plurality of assets, thereby changing the operational status of the asset or determining the location of the asset.

33. The remote asset management system of claim 32 wherein each of the at least one programmable wireless modules is integral with the associated linked asset's circuitry such that the remote system server service platform may have remote access to critical control parameters of the linked asset's operating system.

34. The remote asset management system of claim 31 wherein the water meter includes a programmable wireless module directly interfaced with a flow meter such that a changing jet of water flow is configured to generate an electromotive force that disrupts a magnetic field passively monitored by a plurality of electrodes, the electrodes configured to send a signal to a processing circuit configured to totalize a rate of flow generated by a frequency of oscillation and send a totalized flow measurement to the at least one programmable wireless module periodically and/or in response to a request received from the wireless module.

35. The remote asset management system of claim 31 wherein at least one of the plurality of assets is a video recorder and wherein the remote server is further configured to monitor the scheduling of television broadcasts according to stored user preferences and forward messages of upcoming programs to a user and organize the programming of a home video recorder in response to messages received back from the user.

36. The remote asset management system of claim 1 wherein each of the at least one programmable wireless module is further configured to receive transmissions from the remote system server service platform, the received transmissions including instructions to the at least one programmable wireless module to monitor and/or control a condition in the associated asset via a fixed or wireless connection wherein said condition is at least one selected from the group comprising: a mechanical condition, an output of a stepper motor, a thermocouple sensor, an inductive coil meter, an electromagnetic servo, a level of performance, a location, a status, an environmental condition, a temperature, a pressure, a sound level, a monitored chemical composition, a light intensity, a humidity, a battery charge level, a use of the asset, an operational use, battery duty cycle parameters, a power supply, magnetic field, sea pressure, tectonic sensor data, air speed, water flow, chemical substances.

37. The remote asset management system of claim 36 wherein each of the at least one programmable wireless module is further configured to control the power supply delivered to at least one of the plurality of assets based on the instructions from the remote system server service platform, wherein the asset has a reduced power state, a raised power state, an on state, and an off state.

38. The remote asset management system of claim 36 wherein the transmission from the remote system server service platform further includes additional instructions to monitor and/or control an environmental condition wherein said environmental condition is at least one selected from the group consisting of: acidity, alkalinity, dissolved oxygen, carbon monoxide, contaminant, radioactivity, river level, wind speed, weather condition, surface sea temperature, deep sea temperature, seismic activity, wave height, sea current, wave displacement speed, oil spillage propagation, river contamination, flood prediction.

39. The remote asset management system of claim 1 wherein communications transmitted between a local and/or the remote system server service platform and the at least one programmable wireless device and communications transmitted between the plurality of assets and the at least one programmable wireless module are at least one of: GPRS data, TCP/IP data, Bluetooth data, ultrasound data, data as a graphical image, data in a graphic form, EMS messages, MMS messages, SMS messages, IP packets, data-calls, circuit-switched voice calls.

40. The remote asset management system of claim 39 wherein the communications are encrypted and/or encoded and may include a first key generated from a first end of the communications link and second key generated from a second end of the communications link, wherein the communication includes VPN encryption and/or comprise firewall capability.

41. The remote asset management system of claim 39 wherein the system server service platform is configured to receive processed data from the at least one programmable wireless module linked to the asset for the purpose of providing consumer and/or corporate services.

42. The remote asset management system of claim 1 wherein the system server service platform is further configured to receive alarms from the at least one programmable wireless module when thresholds of monitored data are crossed, wherein the system server service platform is further configured to alert at least one of: an emergency service center, a security service center, an asset servicing center, a facilities management center, a freight management center, a vending machine management center, a household consumer, a vehicle service center, a hospital, a research laboratory, a pharmaceutical laboratory, and a fleet management center for real time fleet supervision.

43. The remote asset management system of claim 42, wherein the fleet includes at least one selected from the group consisting of: busses, trucks, taxis, ambulances, trains, aircraft, and emergency service vehicles.

44. The remote asset management system of claim 1 wherein the system server service platform is further configured to receive and further process linked asset data gathered and processed by the at least one programmable wireless module, wherein the system server service platform is configured to process the received linked asset data in accordance with an asset management application and forward the further processed linked asset data to an at least one asset operator.

45. The remote asset management system of claim 44 wherein each of the plurality of assets comprises an operating system and an asset management system, wherein the exchange of messages may render inoperable certain functionality of the asset and asset management system, thereby preventing access to operation of the asset and/or access to any stored data in the asset.

46. The remote asset management system of claim 44 wherein the plurality of assets each include a laptop computer and wherein an exchange of messages may be used to transfer a default access password to the laptop computer, thereby enabling an authorized and authenticated user to gain access to data on the laptop computer when the user has forgotten the access password or when the password does not work.

47. The remote asset management system of claim 46 wherein a first message transferred to the laptop computer comprises the default access password and is configured to activate a software module in the laptop computer and establish a secure communication channel between the laptop computer and a remote helpdesk server, the laptop computer and the remote helpdesk server configured to exchange identification data for authenticating the user, and wherein the remote helpdesk server is configured to send a second access password to the laptop computer, the second access password configured to allow the user complete access to the laptop computer.

* * * * *